Jan. 25, 1938.  L. A. FRAYER  2,106,275
FEED AND CUT-OFF MECHANISM
Filed Feb. 27, 1936  4 Sheets-Sheet 1

INVENTOR.
LEE A. FRAYER
BY Kwis, Hudson & Kent
ATTORNEYS.

Jan. 25, 1938.   L. A. FRAYER   2,106,275
FEED AND CUT-OFF MECHANISM
Filed Feb. 27, 1936   4 Sheets-Sheet 3

INVENTOR.
LEE A. FRAYER
BY Lucis, Hudson & Kent
ATTORNEYS.

Jan. 25, 1938.     L. A. FRAYER     2,106,275
FEED AND CUT-OFF MECHANISM
Filed Feb. 27, 1936     4 Sheets—Sheet 4

INVENTOR.
LEE A. FRAYER
BY Kwis, Hudson & Kent
ATTORNEYS

Patented Jan. 25, 1938

2,106,275

UNITED STATES PATENT OFFICE 2,106,275

FEED AND CUT-OFF MECHANISM

Lee A. Frayer, Kent, Ohio, assignor to The Lamson & Sessions Company, Cleveland, Ohio, a corporation of Ohio Application February 27, 1936, Serial No. 66,105

27 Claims. (Cl. 10—12)

This invention relates to improved mechanism for feeding bar stock, and to improved mechanism for cutting sections from the bar of stock as may be desired for the production of various articles.

An object of the invention is to provide improved mechanism for feeding bar stock wherein novel means is provided for supporting and operating a bar gripping element.

Another object of the invention is to provide improved mechanism for cutting sections from bar stock wherein a novel cutter mounting and operating arrangement is employed.

Still another object of the invention is to provide a novel cut-off device having a movable cutter and actuating means therefor, so arranged that operation of the cutter actuating means in a direction to cause the desired cutting action also causes the cutter to be pressed towards a stock supporting member with which the cutter cooperates.

A further object of this invention is to provide a novel cut-off device for use with a machine adapted to operate on sections cut from bar stock, and wherein such machine includes a movable slide and the cut-off device includes a cutter which is actuated by movements of the slide.

Yet another object of this invention is to provide an improved cut-off mechanism having means for temporarily storing one or more blanks between the cutting operation and the delivery of blanks to a succeeding operation.

Other objects and advantages of the invention will be apparent from the following description when taken in conjunction with the accompanying sheets of drawings, wherein Fig. 1 is a plan view, with parts broken away, showing my improved feed and cut-off mechanism applied to a metal working machine.

More detailed reference will now be made to the accompanying drawings which illustrate improved feed and cut-off mechanism adapted to operate on bar stock to produce sections or blanks for use in a metal working machine or the like. It will be understood, of course, that the drawings are illustrative only, and that the invention is not only susceptible of embodiment in various other constructions and arrangements, but that my improved feed and cut-off mechanism may be used in conjunction with various machines and processes.

Figure 1:
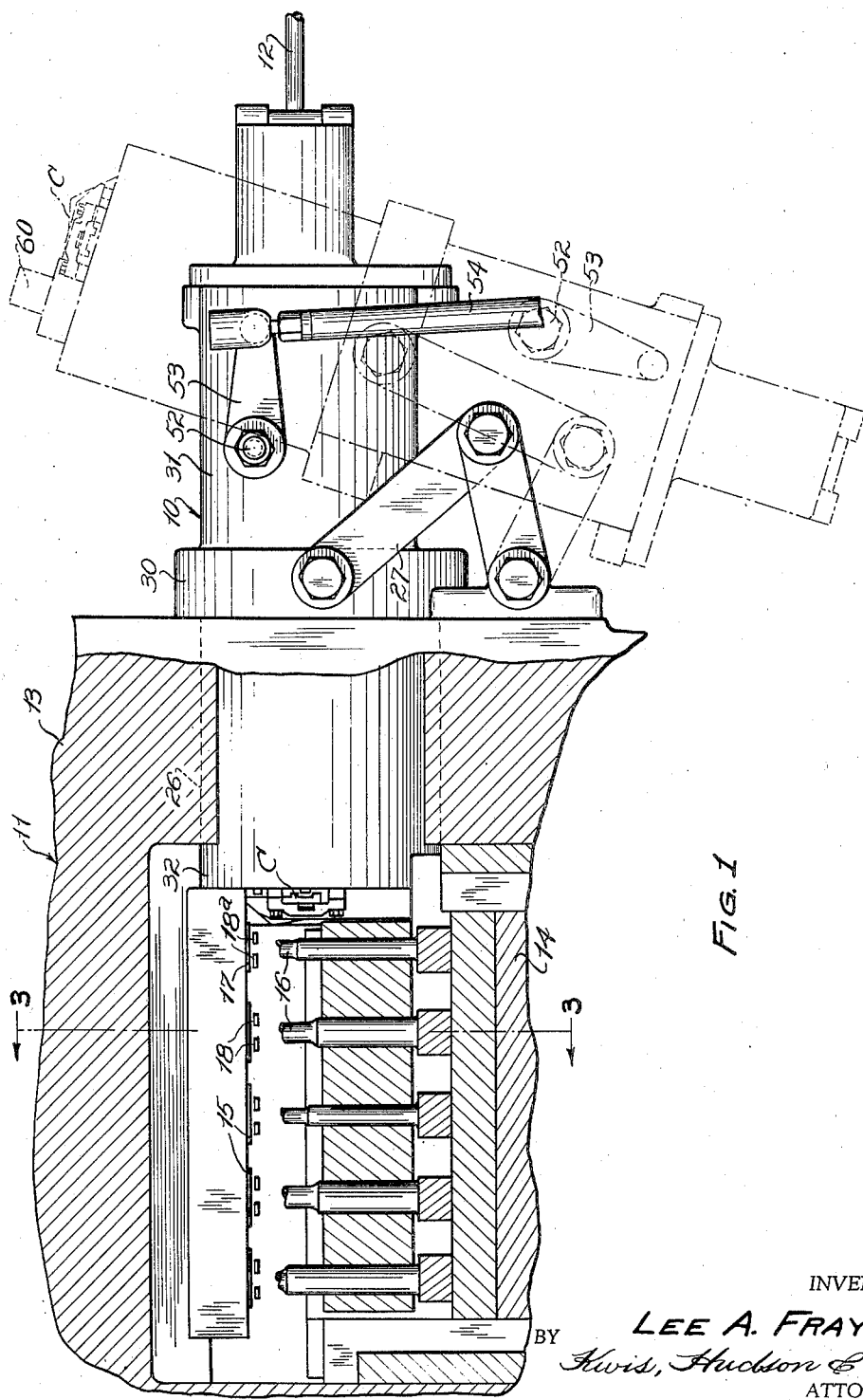

My improved feed and cut-off mechanism is preferably, though not necessarily, embodied in a unitary cartridge-like head 10 which may be suitably mounted upon or adjacent to the machine or apparatus with which the mechanism is to be used. Embodied in this cartridge-like unit is the feed mechanism F and the cut-off mechanism C. In Fig. 1 of the drawings I show the cartridge-like feed and cut-off unit 10 associated with a metal working machine 11, which may be a machine adapted to produce nuts from blanks or sections cut from the leading end of the bar stock 12. The machine 11 may be of any suitable type of construction and, for example, may be a nut-making machine of the type having a frame 13 in which a ram or slide 14 is reciprocably operable. The machine may include a row or series of dies 15 which are supported on the frame of the machine and which operate on the blanks. The machine may also include a plurality of punches 16 which are carried by the slide 14 and are adapted to cooperate with the dies 15.

The machine may also include a suitable transfer mechanism T for feeding the severed sections B from the cut-off device C to the initial or end die 17 of the series, and for transferring blanks from one of the dies 15 to another. Any suitable transfer mechanism may be employed, but I prefer to use an elongated transfer mechanism which extends in the direction of the row of dies 15, such as the transfer mechanism disclosed and claimed in copending application Serial No. 66,104, filed February 27, 1936.

For purposes of disclosure of the present invention it is sufficient to explain that this transfer mechanism may include a plurality of article holders each of which is provided with a pair of cooperating fingers 18 adapted to releasably hold one of the blanks B. One of these holders (having fingers 18a) operates to carry individual blanks from the cut-off device C to the initial or end die 17 of the series, and each of the other holders cooperates with a pair of dies whereby the blanks are advanced from one die to another through the series.

The cooperating fingers 18 may be carried by spindles 20 which are mounted in a support 21 and adapted to be rotated by cooperation of a reciprocable rack 22 with gear members 23 carried by the spindles. The support 21 is adapted to be raised or lowered by cooperation of the driving pinion 24 with the rack 25. In the operation of this transfer mechanism the lowering of the support 21 moves the fingers 18 downwardly to engage blanks at the cut-off station C and at certain of the dies 15. Upward movement of the support 21 causes the fingers 18 to be lifted from the cut-off station and the dies with each pair of fingers carrying a blank. Rotation of the spindle 20 then causes the fingers to advance the blanks to points above the dies of the series. Lowering of the support 21 aligns the blanks with the die openings so that the blanks can be removed from the fingers by movement of the punches into the dies. After removal of the blanks from the fingers the support 21 is moved upwardly to lift the fingers from in front of the dies after which the spindles are rotated in the reverse direction to return the fingers to a position from which they can be lowered to again pick up another group of blanks.

The operation of my improved feed and cut-off mechanism provides the blanks B which are individually picked up by the fingers of the transfer mechanism and supplied to the initial or end die 17 of the series. The cartridge-like head 10, which embodies the feeding and cut-off mechanisms F and C, is preferably supported on the frame 13 of the machine so that its axis will extend in substantially the same direction as the row or series of dies 15. This relative arrangement may be obtained by providing the frame 13 with an opening 26 in which a portion of the cartridge 10 is received. The cartridge 10 may also be connected with the frame of the machine by suitable linkage 27 which will permit it to be withdrawn from the opening 26 and swung relative to the frame. This mounting for the cartridge allows the same to be swung to the dotted line position indicated in Fig. 1, in which position the feed and cut-off mechanisms are more readily accessible for inspection or repair. When the cartridge is positioned in the opening 26 of the frame, as shown in Fig. 1, the cut-off device C, which is to be described more in detail hereinafter, is located adjacent the end die 17 and in operative relation to the slide 14.

Figure 2:
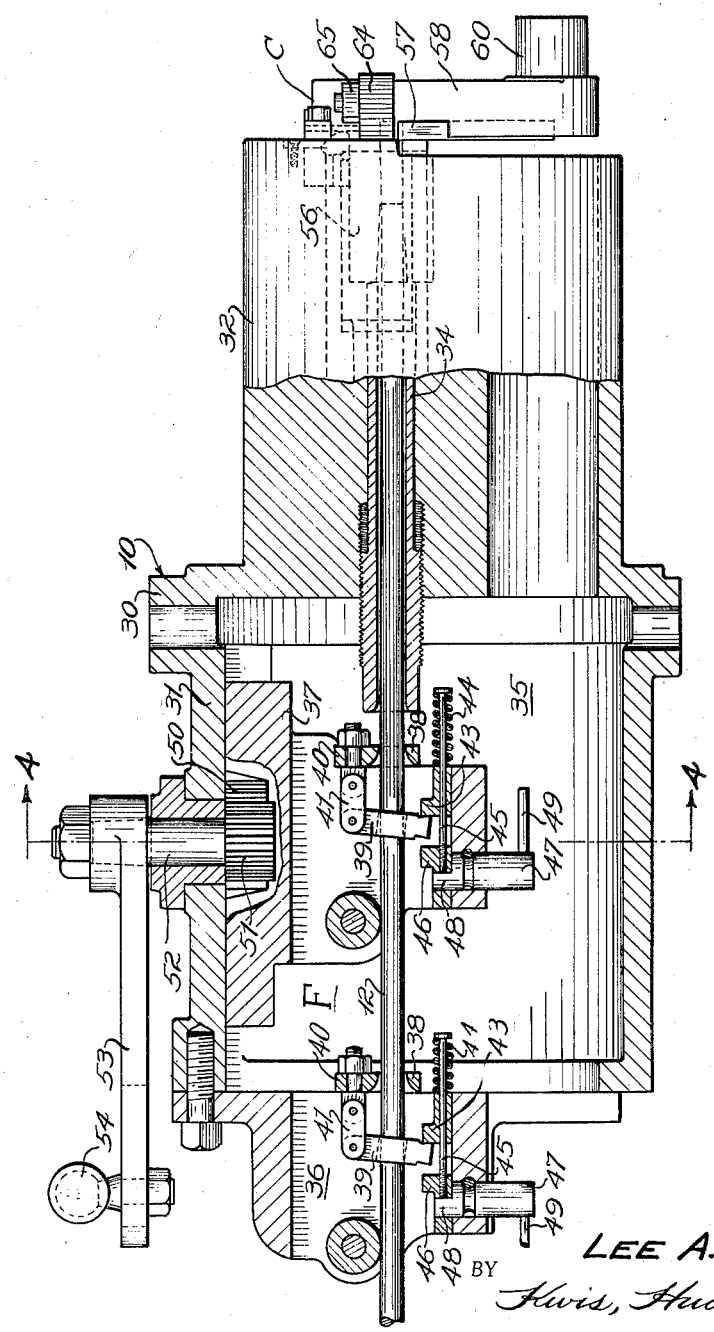
Fig. 2 is a view, partly in section and partly in elevation, showing my feed and cut-off assembly unit.
Figure 3:
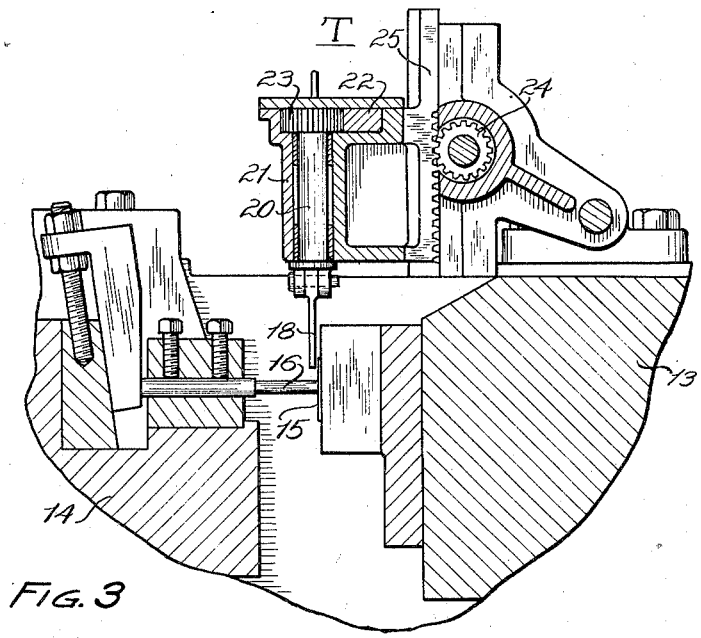
Fig. 3 is a partial vertical sectional view taken on the line 3—3 of Fig. 1, and showing the dies and transfer mechanism of the machine with which my feed and cut-off mechanism is used.
Figure 4:
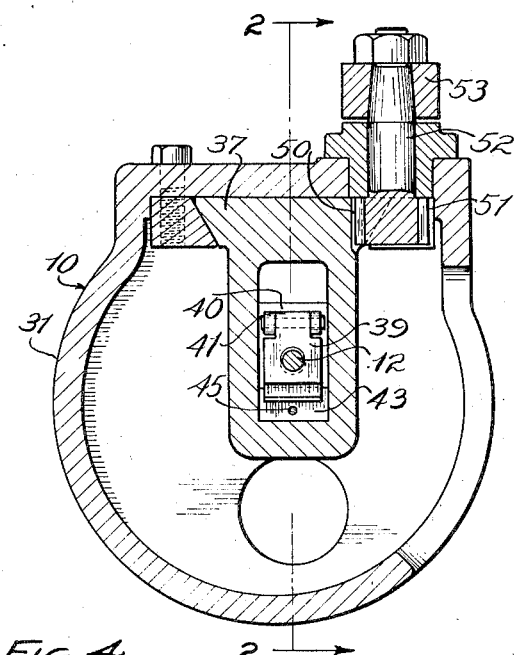
Fig. 4 is a transverse sectional view taken through the feed mechanism as indicated by line 4—4 of Fig. 2.
Figure 5:
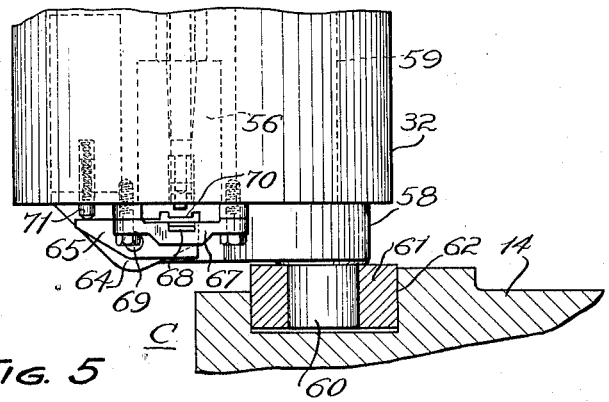
Fig. 5 is a partial plan view of the cut-off mechanism.
Figure 6:
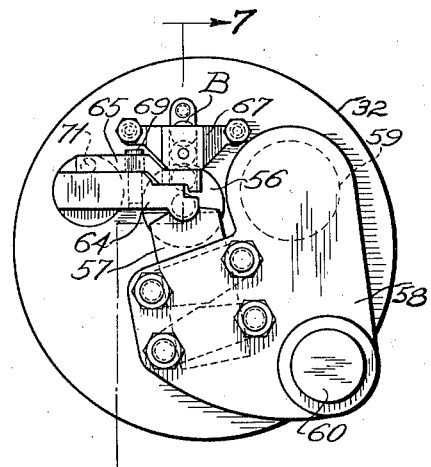
Fig. 6 is an end view of the cut-off mechanism.
Figure 7:
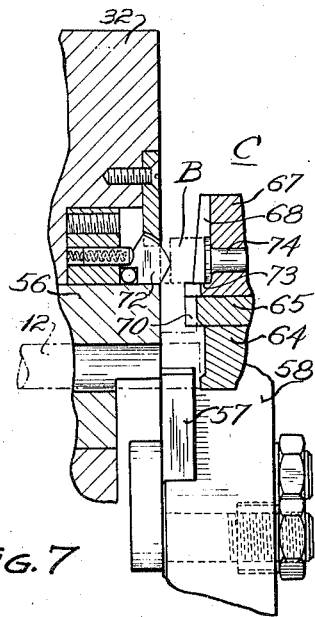
Fig. 7 is a partial vertical sectional view of the cut-off mechanism, taken as indicated by line 7—7 of Fig. 6.

As shown in Figs. 2 and 4, the cartridge 10 may be provided with an elongated frame 30 having a hollow part 31 which houses the mechanism for feeding the bar stock 12, and a projecting part 32 which may be of generally cylindrical cross section to be received in the opening 26 of the frame 13. The projecting part 32 provides a support for the cut-off device C and has a guide bushing 34 therein for directing the bar stock 12 to the cut-off device.

The feed mechanism F comprises a stock advancing device 35 and a locking device 36. These devices are of similar construction and differ only in that the advancing device 35 is carried by a reciprocable slide 37 whereas the locking device 36 is stationarily mounted on the frame part 31. Each of these devices includes a guide member 38 through which the bar stock 12 extends, and a gripping element 39 adjacent to the guide and also having an opening through which the stock extends. The opening of the gripping element is so formed that tilting of the element will cause edges of the opening to firmly grip the stock.

For supporting the gripping element 39 so as to permit such cooperation with the stock, I provide a pivot member 40 which may be mounted on the guide member 38 above the opening through which the stock passes. The pivot member is preferably disposed with its axis lying substantially in the same vertical plane that includes the axis of the stock and of the opening of the guide 38. The upper end of the gripping element 39 may be hingedly connected with the pivot member 40 by means of a link 41 having forked ends. The pivot member permits lateral swinging of the gripping element transversely with respect to the longitudinal axis of the stock, and the hinge connection provided by the link 41 permits tilting of the element into gripping engagement with the stock and also permits lifting and lowering of the element for proper cooperation with the stock such that the element may rest on the stock.

The flexibility provided by the pivot member 40 and the hinge link 41 enables the gripping element 39 to accommodate itself to stock which is not entirely straight. It should be understood, however, that if straight stock is supplied this pivot member and hinge link may be omitted in favor of any suitable mounting permitting relative movement of the element sufficient to produce the desired gripping action.

In association with the gripping element 39 I may provide a plunger 43 which is normally pressed by a spring 44 so as to engage the lower end of the element and cause tilting thereof in a direction to grip the stock. The plunger 43 and the spring 44 are preferably mounted upon a guide pin 45 which is carried by a shiftable block 46. The lower end of the element 39 is received in a space between the plunger 43 and the shiftable block 46, so that by changing the position of the block relative to the guide 38 the element can be rendered operative or inoperative. When the block 46 is shifted away from the guide 38 the spring pressed plunger cooperates with the gripping element to tilt the same into gripping cooperation with the stock. When the block is shifted toward the guide 38 the plunger 43 moves away from the gripping element and the latter assumes a substantially straight vertical position such that relative movement between the element and the stock can take place without the occurrence of a gripping action. Appropriate means may be provided for shifting the block 46 in this manner. For example, a suitably mounted shaft 47 may have an eccentric pin 48 which engages in a transverse slot of the block 46 and shifts the same in one direction or the other as the shaft is manually rotated by means of the hand lever 49.

The slide 37 which carries the stock advancing device 35 may be reciprocated on the frame 31 by any suitable actuating mechanism such as by providing the slide with a rack 50 with which a driving pinion 51 meshes. The pinion may be carried by a shaft 52 which is adapted to be oscillated by a lever 53. Movement may be imparted to the lever 53 by a link 54 which connects the lever with a cam device or other suitable motion transmitting part of the machine 11.

From the feeding arrangement just described it will be seen that when the slide 37 moves towards the cut-off device C the stock will be advanced in the same direction by the engagement of the gripping element 39 therewith. During this movement of the stock advancing device 35 the bar 12 slides freely through the locking device 36. When the slide 37 moves in the reverse direction, that is away from the cut-off device C, the stock advancing device 35 slides freely over the bar 12 and, at this time, the locking device grips the bar and prevents backward movement thereof.

My improved cut-off device which, as mentioned above, may be mounted at the inner end of the projection 32 of the cartridge 10, includes a suitable die or the like 56 having an opening through which the leading end of the stock is fed and a movable cutter 57 cooperating with the die. The cutter 57 may be carried by an arm or lever 58 which is movable transversely with respect to the axis of the stock being fed. The lever 58 may be mounted on the projection 32, as by being provided with a pivot pin 59 which extends in the direction of the axis of the stock and is received in an opening of the projection. Movement may be imparted to the lever 58 through an actuating part thereon, preferably in the form of a crank pin 60 which is off-set relative to the axis of the pivot pin 59.

In accordance with one feature of my invention I operate the cutting mechanism by movements transmitted from the slide 14 of the machine, and for this purpose I provide a bearing block 61 which engages the crank pin 60 and is slidable in a guideway 62 provided on the slide 14. When the projection 32 of cartridge 10 is inserted into the opening 26 of the frame, the crank pin 60 engages in the opening of the bearing block 61 and, during reciprocation of the slide, movement will be transmitted to cause swinging of the arm 58 and cooperation of the cutter 57 with the die 56. It will thus be seen that each forward stroke of the slide 14 causes the cutter 57 to sever a section or blank B from the leading end of the bar of stock 12.

For determining the length of the section to be cut from the leading end of the bar, I provide a stop 64 which is spaced from the member 56 a desired distance and which is engaged by the leading end of the stock as it is fed forward by the advancing device 35. When a section or blank is cut from the leading end of the stock it is lifted upwardly by the cutter 57 and is thereby delivered to the blank storage means which prevents such severed blank from dropping back down in front of the bar of stock where it would obstruct the feeding thereof.

In the operation of certain machines with which my cut-off device may be used, the blank handling or transfer mechanism may not be adapted to pick up individual blanks immediately upon being cut from the stock. For example, in the case of the machine 11 each forward stroke of the slide, which causes a blank to be cut from the bar 12, also causes the punches to cooperate with the dies 15 but at this time the fingers of the transfer mechanism T are in their advanced position and hence are not ready to receive the blank then being cut from the bar. I therefore provide the cut-off device with novel means for temporarily storing one or more blanks after cutting and in readiness to be picked up by the transfer mechanism when the timed operation of this mechanism, relative to the slide, will permit.

This blank storage means includes an escapement-like member 65, and a member 67 thereabove having a channel-like guideway 68 which receives the blanks from the escapement member. The escapement member may be a lever mounted on the stop 64 by means of a pivot 69 and provided adjacent one end thereof with a grooved portion 70 which registers with the guideway 68 and is normally biased toward the die 56 by a spring pressed plunger 71 acting on the other end of the lever.

Each blank cut from the bar of stock is lifted by the cutter, as explained above, and is received in the grooved portion 70 of the escapement lever. The blank is pressed against the die 56 by the escapement lever and is thereby temporarily held. As each blank is lifted by the cutter in this manner, it pushes the preceding blank upwardly from between the escapement lever 65 and the die 56 into the channel-like guideway 68 of the member 67. Upon movement of the blank into this guideway it is engaged by a spring pressed rocking plunger 72 which shifts the blank laterally, that is, in the direction of its axis, so that at least a portion of the blank overlies a projecting shoulder 73. This shoulder provides an abutment which prevents downward shifting of the blank when it is engaged by the fingers of the transfer mechanism. The shoulder thus supports the blank against downward movement while the transfer fingers 18a are being spread apart by engagement with the portion of the blank which projects from the guideway. If desired a renewable button-like member 74 may be provided as a locating stop against which the blanks are pressed by the rocking plunger 72.

It has already been explained that the cut-off device C is operated in timed relation to the movements of the slide 14, but in addition to this, it should be understood that the feed mechanism F and the transfer mechanism T are also actuated in timed relation to the operation of the slide. This timed actuation of the feed and transfer mechanisms can be obtained in any desired manner such as by providing the machine 13 with suitable cam means for actuating the link 54, the shaft of the pinion 24, and the rack bar 22. The blank storage arrangement above described permits this timed operation of the cut-off device by the slide by temporarily storing a blank until the transfer mechanism is ready to pick it up, and thus provides for the feeding of blanks from a cut-off device to a die mechanism continuously and at substantially the rate of production.

Figure 8:
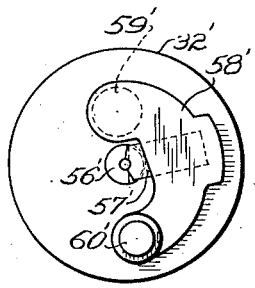
Fig. 8 is an end view similar to Fig. 6 but showing another arrangement for my cut-off mechanism.

In Fig. 8 of the drawings I have shown another arrangement for the cutter and the cutter actuating lever. In this arrangement the cutter actuating lever 58' is of arcuate form and is pivoted on the support 32' by a pivot pin 59' located at one side of the die 56' and extending in the direction of the axis of the die into an opening in the support. The lever 58' is provided with an actuating part, such as a crank pin 60' which, in accordance with my invention, is located to the opposite side of the die 56' and extends in substantially parallel relation with the pivot pin 59' but in the opposite direction. The cutter 57' is mounted on the lever 58' at a point between the pivot pin 59' and the crank pin 60', such that it will have cutting cooperation with the die 56'.

When force is applied to the crank pin 60' to cause swinging of the arm 58' thereof transversely of the axis of the opening in the die 56', it will be seen that the point of application of the force to the crank pin is axially offset with respect to the pivot pin 59' and that this will tend to cause the cutter 57' to be pressed toward the cutter end of the die with which it cooperates. It will be understood, of course, that this shifting of the cutter 57' toward the die 56' will be a movement in the nature of only a fractional part of an inch, such as might result from a flexing of the lever 58' or the taking up of existing lost motion between the moving parts. However, such pressing of the cutting member 57' against the die 56' during the cutting stroke causes a very satisfactory cut to be made cleanly and substantially without crushing, so that the sections or blanks cut from the stock have a desired regular form with their end faces substantially square with respect to the axis of the stock.

From the foregoing description and accompanying drawings it will now be readily understood that I have provided improved feed and transfer mechanism embodying various novel features of construction and arrangement whereby bar stock may be efficiently fed and blanks or sections of a desired regular form can be cut from the leading end of the stock. It will be understood further that my improved feed and cut-off mechanism is adapted to be embodied in a cartridge-like head which can be mounted adjacent the dies and slide of a metal working machine or the like, such that the cut-off device may be actuated by movements of the slide of the machine and the severed blanks may be directly fed to the adjacent end of a row of dies.

Although I have illustrated and described the apparatus of my invention in a somewhat detailed manner, it will be understood, of course, that I do not wish to be limited to the particular constructions and arrangements illustrated and described, but regard the invention as including such changes and modifications as do not constitute a departure from the spirit of the invention and the scope of the appended claims.

Having thus described my invention, I claim:

1. In a feeding device, a support, a gripping element having an opening through which a bar of stock may extend, said opening being shaped to grip the bar upon tilting of the element relative thereto, and means mounting said element on said support comprising pivot means permitting swinging of the element transversely to the axis of the bar and hinge means permitting tilting of the element.

2. In a stock feeding device, a support having an opening to receive a bar of stock, a member pivoted on said support above said opening with its pivot axis lying in substantially the same vertical plane as the axis of said opening, a gripping element supported on the stock and having an opening through which the stock extends, and means providing a hinge connection between said pivoted member and the top of said gripping element.

3. In a device for feeding bar stock, a reciprocable member, a gripper having an opening through which the bar extends, means flexibly mounting said gripper on said reciprocable member, and means biasing said gripper into gripping engagement with the bar.

4. In a device for feeding bar stock, a reciprocable member, a gripper having an opening through which the bar extends, means flexibly mounting said gripper on said reciprocable member, means biasing said gripper into gripping engagement with the bar, and means manually operable to render said biasing means ineffective.

5. In a cut-off device, a support having a hollow die through which stock may be fed, a lever pivoted on said support and having an actuating part spaced from its pivot, and a cutting element on the lever at a shorter relative distance from the pivot than said actuating part and movable by the lever transversely to the hollow die for shearing cooperation therewith.

6. In a cut-off device, a pivoted lever having an actuating part spaced from its pivot, and a cutting element on the lever to the same side of said pivot as the actuating part but at a shorter relative distance from the pivot than said actuating part and having its cutting edge adjacent a straight line passing through the axis of said pivot and the axis of said actuating part.

7. In a cut-off device, a support having a hollow member through which bar stock may be fed, a lever pivoted on said support to one side of said member, a cutter carried by the lever and adapted to be moved thereby transversely of said member and in shearing cooperation therewith, and an actuating part on said lever at the opposite side of said member and disposed substantially in line with said cutter and pivot.

8. In a cut-off device, a hollow member through which bar stock may be fed, a lever movable transversely to the axis of said hollow member, a cutter carried by said lever and adapted for shearing cooperation with said member, and lever actuating means including a part relatively offset from the plane of the cutter whereby force applied to such part causes the cutter to be pressed against said member during its transverse cutting movement.

9. In apparatus of the character described, a frame, a series of dies thereon, a slide reciprocable on said frame and carrying punches for cooperation with said dies, a cut-off device supported on said frame adjacent said dies and including a movable cutter, and cutter actuating means cooperating with the slide for transmitting motion therefrom directly to the cutter.

10. In apparatus of the character described, a frame, a series of dies thereon, a slide reciprocable on said frame and carrying punches for cooperation with said dies, a cut-off device supported on said frame adjacent said dies and including a movable cutter, means connecting the cutter directly with said slide whereby working movement of the slide causes actuation of the cutter, and means operable in timed relation to the slide for transferring blanks from the cut-off device to one of said dies.

11. In combination with a nut-making machine or the like having a frame and a slide reciprocably operable thereon, cooperating dies on said frame and slide, a cutter, means pivotally mounting said cutter adjacent said slide including a member having an eccentric actuating part, and bearing means on the slide cooperating with said eccentric part whereby movements of the slide to cause functioning of said dies cause actuation of the cutter.

12. In apparatus of the character described, a frame, a slide operable thereon, a lever having pivotal connection with said frame and carrying a cutter and an actuating pin, and a bearing block carried by said slide and engaging said pin, said bearing block being shiftable on the slide.

13. In apparatus of the character described the combination of a frame having a row of dies thereon and an opening adjacent the dies, and an assembly unit removably received in said opening and embodying feed and cut-off mechanisms, said unit being of elongated cartridge-like form and extending in the direction in which said row of dies extends.

14. In apparatus of the character described the combination of a frame, a series of dies thereon, means for feeding bar stock toward one end of said series with its axis extending in substantially the direction in which said series extends, and a cut-off device adjacent said one end of the series adapted to cut sections from the stock being fed.

15. In apparatus of the character described the combination of a frame, a row of dies thereon, transfer mechanism cooperating with said dies and extending substantially in the direction of said row, means for feeding bar stock toward one end of said row with its axis extending in substantially the direction in which the row extends, and a cut-off device between said feeding means and said one end of the row.

16. In apparatus of the character described the combination of a frame, a row of dies thereon, a slide operable on the frame and carrying punches for cooperation with said dies, transfer mechanism cooperating with said dies and extending substantially in the direction of said row, means for feeding bar stock toward one end of said row with its axis extending in substantially the direction in which the row extends, a cut-off device adjacent said one end of the row, and means for actuating the cut-off device by movements of the slide.

17. In combination, a frame having a row of stations thereon, a cut-off device adjacent one end of said row but offset therefrom, a slide operable on said frame and adapted to cooperate with said stations, means for feeding bar stock to said cut-off device, and means extending into the path of movement of the slide and cooperating therewith for actuating the cut-off device by movements of the slide.

18. In a nut-making machine or the like the combination of a frame having a recess and a slide reciprocable therein and also having a laterally extending opening communicating with the recess, an assembly unit embodying feed and cut-off mechanisms and removably received in said opening, and hinge means mounting said unit on said frame for movement into and out of said opening.

19. In combination, a device for cutting blanks from bar stock, a forming mechanism to which the blanks are fed after cutting and at substantially the rate of production, and means temporarily storing each blank between the feeding of the previously cut blank and the cutting of the next succeeding blank.

20. In combination, a die, a slide movable to bring a punch into cooperation with said die, a cutter adapted to cut a blank from a bar of stock upon each forward movement of the slide, a blank holder operable in timed relation to said punch for carrying blanks to the die at substantially the rate of production by the cutter, and means temporarily storing each blank between the carrying of the previously cut blank and the cutting of the next succeeding blank.

21. In combination, a cutter movable to sever blanks from bar stock and to advance each blank after cutting, and means engaged by the blanks in succession and adapted to prevent backward movement thereof, said means being yieldable and biased to provide a barrier past which the blanks are forced in succession by the action of the cutter.

22. In combination, a cutter movable to sever blanks from bar stock and to advance each blank after cutting, means engaged by the blanks in succession and adapted to prevent backward movement thereof, and a blank holder movable into engagement with the blank while it is being held against backward movement, said means being yieldable and biased to provide a barrier past which the blanks are forced in succession by the action of the cutter.

23. In combination, a cutter movable to sever blanks from bar stock, means providing a passage to receive each blank upon severance and in which the blanks are advanced by the action of the cutter, and yieldable means in said passage adapted to grip and temporarily hold each blank between successive cutting strokes of the cutter.

24. In combination, a cutter movable to sever blanks from bar stock, means providing a passage to receive each blank upon severance and in which the blanks are advanced by the action of the cutter, yieldable means in said passage adapted to grip and temporarily hold each blank between successive cutting strokes of the cutter, and means providing a stop for preventing return movement of each blank which is advanced past said yieldable means.

25. In combination, a cutter movable to sever blanks from bar stock, means providing a passage to receive each blank upon severance and in which the blanks are advanced by the action of the cutter, yieldable means in said passage adapted to grip and temporarily hold each blank between successive cutting strokes of the cutter, means providing a stop for preventing return movement of each blank which is advanced past said yieldable means, and means for shifting such advanced blank to overlie said stop.

26. In combination with the frame of a nut-making machine or the like, a die on said frame, a slide reciprocable in the frame for movement toward and from said die for cooperation therewith, stock feeding means operable to feed a bar of stock in an axial direction transverse to the direction of reciprocation of said slide, and a cut-off device adjacent said die and operable to cut successive sections from the bar of stock, said cut-off device having an operative connection with said slide for actuation thereby.

27. In combination with the frame of a nut-making machine or the like, a die on said frame, a slide reciprocable in the frame for movement toward and from said die for cooperation therewith, a cut-off device on the frame adjacent said die comprising a member pivoted to swing about an axis extending transverse to the direction of slide reciprocation and a cutter carried by said member and movable in a plane extending substantially parallel to the direction of slide reciprocation, means for feeding stock to the cut-off device, and means providing an operating connection between said slide and said pivoted member whereby the cut-off device is actuated by reciprocation of the silde.

LEE A. FRAYER.